United States Patent Office 3,325,354
Patented June 13, 1967

3,325,354
METHODS FOR CONTROLLING INSECTS AND BACTERIA
Edward D. Weil, Yonkers, N.Y., assignor to Hooker Chemical Corporation, New York, N.Y., a corporation of New York
No Drawing. Filed May 27, 1966, Ser. No. 553,320
5 Claims. (Cl. 167—30)

This is a continuation-in-part of Ser. No. 216,036, filed Aug. 10, 1962, now issued as United States Letters Patent 3,255,227.

This invention relates to the pesticidal use of new compositions of matter and more particularly to the herbicidal, biocidal, germicidal, bactericidal and insecticidal use of novel chloroinated alicyclic alcohols, their esters, sulfonates, sufates and sulfites.

The pesticidal compositions of this invention can be represented by the following structure:

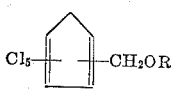

wherein R is selected from the group consisting of hydrogen, an acyl radical, an acid sulfate, a phenylalkanoate, a halogenated alkanoate, a heteroate, a phosphate, a phosphite and a thioacylate. The product is capable of existing in various isomeric forms with respect to location of the double bonds, and it is intended to encompass the isomer mixtures as well as the individual isomers.

The alcohols and esters of this invention have been found to be particularly useful as herbicides, germicides, insecticides and chemical intermediates.

The novel alcohol compositions of the instant invention are prepared by the vapor-phase reaction of hexachlorocyclopentadiene and methanol, at a temperature between about 350 degrees centigrade to about 600 degrees centigrade.

The method of preparing the alcohol composition of this invention employing methanol is illustrated by the following equation:

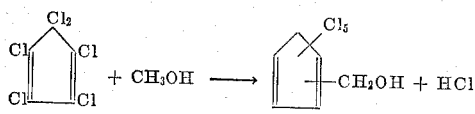

This reaction and the production of the starting materials therefor are more fully described in U.S. 3,255,227.

The esters of the present invention may be prepared from the alcohols by any of the methods known to the art for converting alcohols to esters, as, for example, by direct esterification of the alcohol with the free acid to which the acyl radical is to be introduced, or reaction of the alcohol with the acid chloride or anhydride of the acid. If desired, a catalyst, such as a strong acid, in the case of direct esterification or a base in the case of use of the acid chloride or anhydride, may be used.

Thus there may be produced, for example, alkanoates such as formate, acetate, propionate, butyrate, isobutyrate, valerate, actanoate, laurate and sterate; alkenoates such as acrylate, methacrylate, laurate, crotonate and propiolate; the halogenated alkanoates such as chloroacetate, dichloroacetate, trichloroacetate, dichloropropionate, bromoacetate; the phenylalkanoates such as phenylacetate, benzoate, chlorobenzoate, toluate and phthalate (mono- or diesterified isophthalate and terephthalate); polycarboxylic acid esters such as oxalate, succinate, adipate, sebacate, maleate, fumarate and tartrate; and esters of hetero compounds in which the hetero atom is oxygen, sulfur, nitrogen, phosphorus, boron, titanium or antimony such as furoate, nicotinate, phenoxyacetate, 2,4-dichlorophenoxyacetate, sulfite, sulfate (mono or bis), benzenesulfonate, phosphate esters such as phosphate (mono-, di- or triesterified), phosphite (mono-, di- or triesterified), O,O-dialkylphosphate; the thiolates such as O,O-dialkylthiophosphate, the phosphorodithiolate, xanthate, carbamate, N-alkylcarbamate, N,N-dialkylcarbamate, N-penylcarbamate, N-chlorophenylcarbamate, N,N-dialkylthiocarbamate, borates, titanates and antimonates of pentachlorocyclopentadienylcarbinol. Of the O,O-dialkylphosphates, O,O-dialkylthiophosphates, N-alkyl carbamates, N,N-dialkylcarbamate and N,N-dialkyl thiocarbamates, the species having lower alkyl groups, i.e., one to six carbon atoms, are preferred because of their generally greater pesticidal activity. It is within ordinary skill in the art to make any ester of the novel alcohols disclosed, although the carbon chain length of the organic groups will not generally exceed about 20 carbon atoms. The preferred chain length of the alkanoate alkanoyl and alkenoate alkenoyl group is one to about 20 carbon atoms.

Pentachlorocyclopentadienylcarbinol upon reaction with phosphorus chlorides, thionyl chloride (in presence of base catalyst) or with hydrogen chloride (in presence of Lewis acid catalysts or pressure) also can yield pentachlorocyclopentadienylcarbinyl chloride which previously could not be synthesized and which is an active insecticide, soil fumigant, and useful chemical intermediate. Furthermore, pentachlorocyclopentadienylcarbinol upon oxidation with oxidizing agents such as nitric acid, permanganates, chlorine, manganese dioxide, and the like, yields pentachlorocyclopentadienecarboxylic acid, its aldehyde or esters, which are potent herbicides.

The pesticidal compounds of the present invention are used by applying a compound of the present invention, preferably in diluted form, to the locus of the pest being controlled in a lethal amount. In the herbicidal method, the compounds of the present invention are preferably applied by spraying the plants to be killed with an emulsion in water made by the aid of an organic solvent and an emulsifier, as a solution in a mineral oil or other organic solvent or in dry powder or granular form. The carbinol carbamates and its esters are preferably used as herbicides at a rate of about one to 50 pounds of a compound of the present invention per acre. The exact rates preferred in any given situation depend upon the weed species, stage of growth, vigor, degree of kill required, climatic conditions and other factors which are normally considered by those skilled in the art. As such, amounts of less than about one pound and up to about 100 pounds per acre of toxin can be employed to obtain satisfactory results. The preferred compounds are most preferably applied at a rate of about five to 20 pounds per acre.

The herbicidal compounds can be employed in substantially pure form or in technical grades but usually they are preferably formulated with a solvent, a surface active agent, a solid carrier, usually powdered, and often formulated with other herbicides. Thus, the herbicides may be used by themselves or made the subject of liquid or solid formulations ranging from the very simple to the most complex. For example, if desired, these compositions may be made into a liquid formulation by diluting, dispersing, dissolving or emulsifying with surface active adjuvants or a combination of adjuvants in organic solvents such as petroleum hydrocarbons, alcohols, ketones, esters, glycols, or combinations thereof. Alternatively, the novel herbicides may be made up as solid formulations of powders, dusts, wettable dusts, granules and pellets using solid diluents such as talcs, clays, flours, starches, diatomaceous earth, mica, alkaline earth limes, carbonates and phosphates either in finely divided, granular or pelletized form. The solid and liquid formulations facilitate handling and application at the desired rates and sometimes enhance the herbicidal activity to more than the additive degree.

The liquid compositions, whether solutions or dispersions of the active agents in a liquid solvent, and also the wettable powder or dust compositions of this invention, may contain as a conditioning agent one or more surface active agents in amounts sufficient to render the composition readily dispersible in water. By the term "surface active agents" are meant wetting agents, dispersing agents, emulsifying agents, and the like. A satisfactory but not complete list of such agents is set forth in an article in "Soap and Chemical Specialties," vol. 31, No. 7, pages 50–60; No. 8, pages 48–61; No. 9, pages 52–67; and No. 10, pages 38 (67) (1955). Other diluent materials are mentioned in Bulletin E–607 of the Bureau of Entomology and Plant Quarantine of the United States Department of Agriculture.

Usually, the proportions of either the solvent medium or solvent carrier to herbicidally active material will be within the range of 1:1 to 1000:1 and preferably 3:1 to 200:1. The proportions of surface active agent to herbicide will usually be from about 0.1:1 to 100:1 and preferably about 0.1:1 to 10:1.

The insecticidal method of the invention is preferably effected by spraying or otherwise contacting the compounds of the present invention with the insects to be controlled with a lethal amount of toxin formulated as an emulsion in water, a solution in an organic solvent or formulated on the solid carriers in the form of a dust, wettable powder or granules and the like, as discussed above. The compounds preferably used as insecticides are the sulfonyl compounds such as the sulfate esters, sulfite esters, acetate esters, phosphate esters, hetero esters, and the like compounds described herein. The insects are controlled by applying to the locus of the present or anticipated insect infestation a compound of the present invention at a rate of about 0.25 to five pounds per acre. Depending on the particular insects being controlled, their resistance, the toxin used, their stage of growth, climatic conditions and the like factors well known to the art, the rates can be greater than or less than the preferred rates. However, when applying the insecticidal compounds for the control of insects on plants, it is preferred to maintain the dosage below the lethal rate of the plant to which the insecticide is being applied. This is readily accomplished because the lethal rate for insects is substantially less than that required to kill the plants.

The compositions of the present invention are also useful as biocides, bactericides and germicides when applied in dilute concentrations to the locus of the pests being controlled. Preferably, the compounds are diluted as in emulsions in water, solutions in organic solvents, such as described above, or in the form of solid materials such as powders, dusts, granules and the like. The preferred biocidal, germicidal and bacetericidal compound is the carbinol. The toxic substance is preferably prepared in a dilute concentration of about 0.01 to about one percent concentration and more preferably in the range of about 0.02 to about 0.1 percent concentration of toxic material. The exact concentration for various bacteria will vary with the particular bacteria, and so forth, involved.

The following specific examples further illustrate the invention; however, this detailed disclosure is not to be construed as limiting the scope of the present invention.

*Example 1.—Preparation of pentachlorocyclopentadienylcarbinol*

A mixture of one part by volume of hexachlorocyclopentadiene and four parts by volume of methanol is fed continuousuly at the rate of 115 cubic centimeters per hour into a vertical unpacked Vycor glass tube (150 cubic centimeters inner volume) maintained at 410 to 430 degrees centigrade by an electric furnace. The effluent gases leaving the reactor are condensed by passage through a water-jacketed condenser, and are collected in a water-cooled receiver. Titration of a small aliquot of the receiver contents showed that nearly one mole of hydrogen chloride was evolved per mole of hexachlorocyclopentadiene fed.

The product is distilled at atmospheric pressure to remove unreacted methanol (which was recycled) and then distilled under reduced pressure, collecting the fraction boiling at 80–110 degrees centigrade (0.04–0.05 millimeter of mercury) as the desired product. The product is a pale yellowish wax.

The product is recrystallized from heptane to obtain a colorless crystalline solid, having a melting point of 60–61 degree centigrade. The infrared spectrum showed a band characteristic of the —OH group.

*Analysis.*—Calculated for $C_6H_3Cl_5O$: Cl, 66.0 percent. Found: Cl, 66.1 percent.

*Example 2.—Preparation of pentachlorocyclopentadienylcarbinol*

Into a heated Vycor tube at 430 to 450 degrees centigrade, 748 grams of hexachlorocyclopentadiene and 461 grams of methanol are fed continuously and simultaneously by means of separate feeding pumps, over a period of six hours. The reactor effluent is condensed in a water cooled receiver. Titration of the condensate showed that 0.6 mole of hydrogen chloride was present. The condensate was distilled at atmospheric pressure to recover the unreacted methanol (450 grams). The remaining liquid in the still pot is fractionally distilled under vacuum to remove 673 grams of unreacted hexachlorocyclopentadiene. Then, a fraction was obtained boiling at 95 to 103 degrees centigrade (0.15 to 0.25 millimeter of mercury), which solidified to a waxy solid, of which the yield was 40 grams. The infrared spectrum showed this fraction to be identical to the pentachlorocyclopentadienylcarbinol product of Example 1.

*Example 3.—Preparation of pentachlorocyclopentadienylcarbinol*

Into a Vycor tube at 470 to 480 degrees centigrade is passed 1,012 parts of hexachlorocyclopentadiene and 511 parts of methanol over a period of six hours using separate feed pumps.

The product was distilled as in the preceding example to remove 1,300 parts of unreacted starting materials and then was fractionally distilled, yielding as the principal product 72 parts of pentachlorocyclopentadienylcarbinol, having a boiling point of 85 to 105 degrees centigrade at 0.1 millimeter of mercury absolute pressure. It was identified by its infrared spectrum.

*Example 4.—Preparation of bis(pentachlorocyclopentadienylcarbinyl) sulfite*

Five parts of recrystallized pentachlorocyclopentadienylcarbinol and 15 parts of thionyl chloride are refluxed for twelve hours. The excess thionyl chloride is then distilled off by means of aspirator vacuum and the residue distilled under high vacuum, to obtain 3.5 parts of yellowish liquid of a boiling point of 107 to 108 degrees centigrade at 0.30 millimeter of mercury, which on standing several days solidified to a solid of melting point of 67 to 68.5 degrees centigrade. This was established to be bis(pentachlorocyclopentadienylcarbinyl) sulfite by elemental analysis and the infrared spectrum thereof which showed a band at 1213 cm.$^{-1}$, characteristic of the —O—SO—O—grouping.

*Analysis.*—Calculated for $C_{12}H_4Cl_{10}SO_3$: Cl, 60.7 percent; S, 5.5 percent. Found: Cl, 60.7 percent; S, 5.9 percent.

*Example 5.—Preparation of pentachlorocyclopentadienylcarbinyl acetate*

5.8 parts of pentachlorocyclopentadienylcarbinol and 11.1 parts of acetyl chloride were refluxed for three hours, then vacuum-distilled to collect 5 parts of the acetate ester, a light yellow liquid, of boiling point of 95 to 96 degrees centigrade at 0.5 millimeter of mercury. The infrared spectrum indicates a typical ester carbonyl band at 5.68 microns, confirming the structure.

*Analysis.*—Calculated for $C_8H_5O_2Cl_5$: Cl, 57.2 percent. Found: Cl, 56.9 percent.

Other esters of pentachlorocyclopentadienylcarbinol were prepared as follows:

| Example | Reagent and amount employed per mole of alcohol | Conditions | Ester Obtained | Nature of Product |
|---|---|---|---|---|
| 6 | Benzoyl chloride (one mole) | Reflux in benzene 24 hours | Benzoate | Yellowish wax. |
| 7 | Phthalate (one mole) | Reflux in toluene 10 hours | Acid phthalate | Yellowish solid. |
| 8 | m-Chlorophenylisocyanate (one mole) | Reflux in benzene 12 hours | m-Chlorophenyl carbamate | Light yellowish wax. |
| 9 | O,O-dimethylchlorophosphate (one mole) | Reflux in benzene containing one mole triethylamine for 6 hours. | O,O-dimethyl phosphate | Reddish syrup. |
| 10 | O,O-diethylchlorophosphate (one mole) | ___do___ | O,O-diethyl phosphate | Do. |
| 11 | N,N-diethythiocarbamyl chloride (one mole). | ___do___ | N,N-diethylthiocarbamate | Do. |
| 12 | 96 percent sulfuric acid (excess) | Warm to dissolve | Acid sulfate | Water-soluble oil. |

*Example 13.*—*Herbicidal use of pentachlorocyclopentadienylcarbinol*

Greenhouse flats planted with various representative weed species were sprayed post-emergence with an aqueous dispersion of pentachlorocyclopentadienylcarbinol at a rate corresponding to eight pounds per acre. One week later, the herbicidal effect of the treatment was noted as follows:

Species: Effect
- Wild oat _____ 3
- Cheat grass _____ 3+
- Foxtail _____ 4
- Barnyard grass _____ 3+
- Crabgrass _____ 4
- Johnson grass _____ 4
- Yellow rocket _____ 4
- Pigweed _____ 4
- Velvet leaf _____ 4
- Lamb's-quarter _____ 4
- Curled dock _____ 4

Scale:
- 0=no effect
- 1=slight damage
- 2=moderate damage
- 3=severe damage, plants will not recover
- 4=kill The esters of the above alcohol were also found generally phytotoxic. At eight pounds per acre, 100 percent kill of emerged ragweed and pigweed was obtained by use of the benzoate, phthalate (mono), m-chlorophenylcarbamate, and N,N-diethylthiocarbamate of pentachlorocyclopentadienylcarbinol.

*Example 14*

The pentachlorocyclopentadienylcarbinol of Example 1 was added to nutrient agar at 0.025 percent concentration. The agar was then inoculated with *Staphylococcus aureus* and *Escherichia coli*. The growths of both bacterial species were found to be completely inhibited in the treated agar, whereas large colonies of both species developed in the same agar without the addition of the test chemical.

*Example 15.*—*Utility of various esters*

The sulfite, acetate, O,O-dimethylphosphate and O,O-diethylphosphate esters of Examples 4, 5, 9 and 10 were sprayed as 0.1 percent dispersions in water onto plants infested with Mexican bean beetle and with mites (*Tetranychus atlanticus*). Observed twenty-four hours later, essentially 100 percent kill of both species was obtained using each compound.

The compounds of the invention may be employed in combination with other herbicides and with fungicides, insecticides, growth stimulants, and fertilizers if desired. Their action may be enhanced by suitable choice of solvents, wetting agents, penetrating agents, spreaders, stickers and synergists. The use of the commercial spray additives known collectively as "spreader-stickers" is particularly to be recommended with these compounds.

Various changes and modifications may be made in the method of this invention, certain preferred forms of which have been herein described, without departing from the spirit and scope of this invention.

What is claimed is:

1. A method for the control of insects or bacteria comprising applying thereto an insect or bacteria controlling amount of a compound selected from the group consisting of

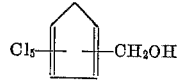

and N,N-diakylthiocarbamate, sulfite, benzoate, phthalate, O,O-dialkylphosphate, sulfate, m-chlorophenylcarbamate, alkenoate and alkanoate thereof, said alkanoate alkanoyl and alkenoate alkenoyl group being of one to 20 carbon atoms.

2. The method of claim 1 wherein the compound

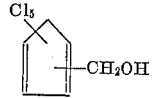

is used as a bactericide.

3. The method of claim 1 wherein the sulfite ester of pentachlorocyclopentadienylcarbinol is used as a insecticide.

4. The method of claim 1 wherein the acetate ester of pentachlorocyclopentadienylcarbinol is used as an insecticide.

5. The method of claim 1 wherein the O,O-dialkylphosphate ester of pentachlorocyclopentadienylcarbinol is used as an insecticide.

References Cited

UNITED STATES PATENTS

| 2,946,674 | 7/1960 | Rakoff | 71—2.3 |
| 3,088,817 | 5/1963 | Richter | 71—2.3 |
| 3,159,660 | 12/1964 | Closson et al. | 71—2.3 X |

LEWIS GOTTS, *Primary Examiner.*

JAMES O. THOMAS, Jr., *Examiner.*